W. R. PARK.

GAS REGULATOR.

APPLICATION FILED JAN. 5, 1912.

Reissued Oct. 21, 1913. 13,631.

Witnesses:

Josephine H. Ryan

Charles D. Wickersham

Inventor:

William R. Park by Roberts Robertson & Buchman

Attorneys

UNITED STATES PATENT OFFICE.

WILLIAM R. PARK, OF TAUNTON, MASSACHUSETTS, ASSIGNOR TO THE UNITED INJECTOR COMPANY, OF NEW YORK, N. Y., A CORPORATION OF NEW YORK.

GAS-REGULATOR.

13,631. Specification of Reissued Letters Patent. Reissued Oct. 21, 1913.

Original No. 948,340, dated February 8, 1910, Serial No. 528,052. Application for reissue filed January 5, 1912. Serial No. 669,650.

*To all whom it may concern:*

Be it known that I, WILLIAM R. PARK, a citizen of the United States of America, and a resident of Taunton, in the county of Bristol and Commonwealth of Massachusetts, have invented certain new and useful Improvements in Gas-Regulators, of which the following is a specification.

My invention relates to the construction of regulators to control and regulate the pressure of gas delivered from a source of supply under pressure and is addressed particularly to situations wherein the pressure of the gas supply varies between wide limits as for instance in the case of acetylene gas tanks employed to supply gas to the lamps of motor vehicles.

The object of my invention is to provide a gas regulator of the character indicated which shall be of simple construction, compact and durable, and at the same time extremely sensitive so that it may insure a delivery of gas under a uniform pressure in spite of very large variations in pressure from the source of supply.

Figure 1:
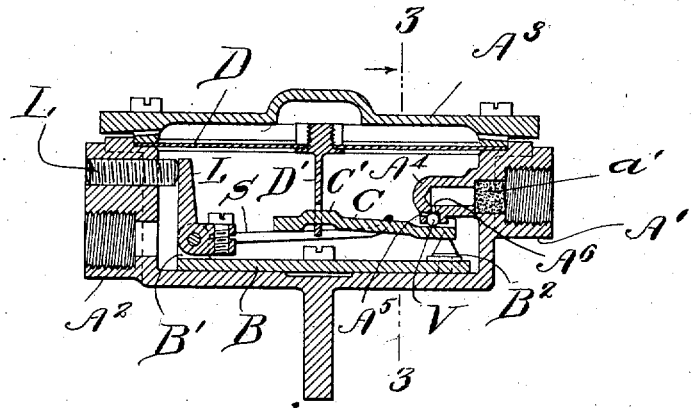
Figure 2:
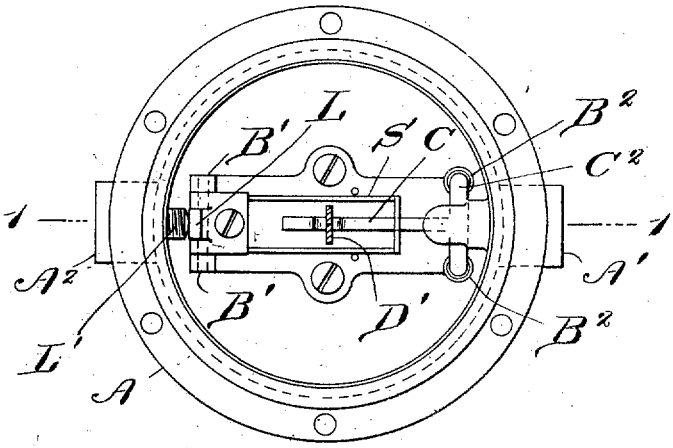
Figure 3:
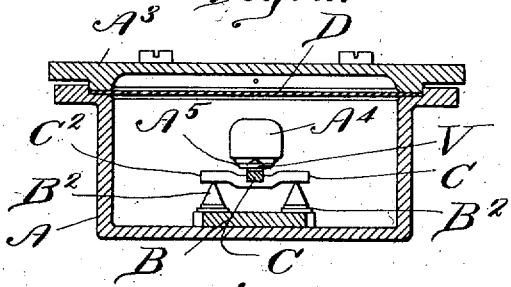

In the drawings hereto annexed which illustrate an example of my invention in its preferred form,—Figure 1 is a vertical cross section of a regulator taken on the line 1—1 of Fig. 2; Fig. 2 is a top plan view of the regulator from which the cover and diaphragm have been removed; and Fig. 3 is a vertical cross section taken along the line 3—3 of Figs. 1 and 2, looking toward the right.

A casing A, composed of cast metal, preferably brass or bronze, is provided with integral bosses $A'$, $A^2$ which are perforated so as to afford inlets and outlets to and from the casing. At one side of the casing the space therein is inclosed by the flexible diaphragm D which is held in its seat gas tight by the cover $A^3$.

On the inside of the casing an inwardly projecting boss $A^4$ is bored to form a continuation of the inlet opening from the outer boss $A'$ and is laterally perforated at $A^6$ with a very small aperture through which gas enters the casing.

If desired, a strainer may be provided as at $a'$. In order to regulate the pressure of gas within the casing whatever may be the pressure at the source of supply which communicates with the inlet at $A'$, I provide a loosely supported self-seating valve at V; this valve is preferably a steel ball and the seat therefor a conical depression in the boss $A^4$ concentric with the small inlet aperture $A^6$. The ball valve V is loosely embraced by the cage $A^5$ which in the instance shown consists of a suitably bored projection integral with the boss $A^4$. The virtue of a loosely supported controlling valve for the gas inlet is that in its operation it is as free as possible from frictional interference and is therefore accurate, quick and sensitive. The valve V rests against the valve controlling lever C. This lever is substantially T-shaped, the cross head $C^2$ integral with the main portion of the lever C extending from side to side and resting upon hardened cone fulcrums $B^2$. These fulcrums are symmetrically disposed on either side of the valve V. The lever C is provided with a slight offset to engage with the rod-connection $D'$ secured to the diaphragm D.

On the side of the casing opposite to the fulcrum end of the lever C there is mounted a bell crank lever L pivoted in the ears $B'$, $B'$ which are integral with the base plate B. In the lower branch of this bell crank lever L the U-shaped spring S is secured, the legs of the spring being fastened at either side of the bell crank lever L. The upper branch of this lever bears against the adjusting screw $L'$, the outer end of which is accessible through the side of the casing A. The U-shaped spring S bridges over the valve controlling lever C bearing upon it at a point midway between the connection $D'$ and the line between the fulcrums $B^2$, giving the lever a three-point bearing. The valve V rests upon the lever C at a point very slightly removed from the line between the two fulcrums.

A very small cross-sectional area of the inlet aperture $A^6$, which in the case of a regulator to control acetylene gas pressure should be about forty one thousandths of an inch in diameter, renders it unnecessary to provide any valve balancing feature since the variations in pressure at such a small aperture are found in practice to be negligible. The movement of the valve V is substantially frictionless. The bearing of the cross piece and the U-shaped spring S upon the lever C is such as to involve very slight movement of one surface over the other and as the two surfaces are preferably made smooth the friction at this point is a negligible quantity. The same is true of the bearing between the lever C at the point C′ with the connection D′. Consequently the spring S may be a light one and the diaphragm B smaller than has heretofore been considered necessary in regulating apparatus for controlling pressure of the order to which this instrument is adapted. The spring S may be adjusted to maintain a pressure in casing A (and therefore at the apertures through which gas is delivered from the regulator such as lamp burners) not greater than that represented by a three inch column of water and this pressure will be maintained though the pressure at the source of supply may vary from 15 atmospheres to a pressure of not more than a ten inch column of water. The sensitiveness of the instrument depends largely upon the elimination of the sources of friction and also upon the arrangement of the several bearing points entirely at one side of the line between the two fulcrums $B^2$; this arrangement distributes the load and diminishes the liability to wear or to constraint in the delicate operation of the moving parts.

The provision of a double-armed or U-shaped spring insures an even balance and equal division of pressure on the fulcrums $B^2$; both the spring S and the lever C are hung on three-point bearings which eliminate all tendency to cramping or friction. The three-points of the lever bearing, at $B^2$, $B^2$ and C′ form the apices of a triangle, and the three points of the spring bearing, at the two sides of the bell crank L and the contact of the spring with the lever C, form the apices of another triangle; the bases of the two triangles are parallel and the apex at C′ of one triangle is within the area of the other, and reciprocally, the apex of the other triangle, at the spring bearing on the lever C, is within the first named triangles. The triangles are isosceles, they have a common axis and the valve bearing lies in the axis. This arrangement is the preferred one, as it insures equal distribution of pressure on all the bearing points.

What I claim and desire to secure by Letters Patent is:

1. In a gas-delivery regulator, the combination of a casing provided with an inlet and outlet, a diaphragm, a valve controlling lever, a two-point fulcrum therefor, a valve for the inlet controlled by the lever, a connection between the diaphragm and the lever, and a spring-bearing on the lever to press it away from the diaphragm, said valve, spring-bearing and the diaphragm connection lying in a line midway between the lever-fulcrums and at right angles to a line connecting the fulcrums.

2. In a gas-delivery regulator, the combination of a casing provided with an inlet and outlet, a diaphragm, a valve controlling lever, a two-point fulcrum therefor, a valve for the inlet, controlled by the lever, a connection between the diaphragm and the lever, and a U-shaped spring bridging and bearing on the lever to press it away from the diaphragm, said valve, spring-bearing, and diaphragm connection lying in a line midway between the lever-fulcrums and at right angles to a line connecting the fulcrums.

3. In a gas-delivery regulator, the combination of a casing provided with an inlet and outlet, a diaphragm, a T-shaped valve controlling lever, a two-point fulcrum therefor, a valve for the inlet, controlled by the lever, a connection between the diaphragm and the lever, a U-shaped spring bridging and bearing on the lever to press it away from the diaphragm, the lever-diaphragm connection and the two points of the lever fulcrum forming the points of an isosceles triangle, the bearing of the spring on the lever and the ends of the U-shaped spring forming another isosceles triangle, the lever-diaphragm bearing lying in the latter triangle, and the spring-lever bearing in the former, both said points and the valve lying in the common axis of the two triangles.

4. In a gas-delivery regulator, the combination of a casing provided with an inlet and outlet, a diaphragm, a valve controlling lever, a two-point fulcrum therefor, a valve for the inlet, controlled by the lever, a connection between the diaphragm and the lever, and a spring bearing on the lever to press it away from the diaphragm, said valve, spring-bearing and diaphragm connection lying in a line midway between the lever-fulcrums and at right angles to a line connecting the fulcrums, and means to adjust the tension of the spring.

5. In a gas-delivery regulator, the combination of a casing provided with an inlet and outlet, a diaphragm, a valve controlling lever, a two-point fulcrum therefor, a valve for the inlet, controlled by the lever, a connection between the diaphragm and the lever, and a U-shaped spring bridging and bearing on the lever to press it away from the diaphragm, said valve, spring-bearing, and diaphragm connection lying in a line midway between the lever-fulcrums and at right angles to a line connecting the fulcrums, and means to adjust the tension of the spring.

6. In a gas-delivery regulator, the combination of a casing provided with an inlet and outlet, a diaphragm a T-shaped valve controlling lever, a two-point fulcrum therefor, a valve for the inlet, controlled by the lever, a connection between the diaphragm and the lever, a U-shaped spring bridging and bearing on the lever to press it away from the diaphragm, the lever-diaphragm connection and the two points of the lever fulcrum forming the points of an isosceles triangle, the bearing of the spring on the lever and the ends of the U-spring forming another isosceles triangle, the lever-diaphragm bearing lying in the latter triangle, and the spring-lever bearing in the former, both said points and the valve lying in the common axis of the two triangles, and means to adjust the tension of the spring.

7. In a gas-delivery regulator, the combination of a casing provided with an inlet and outlet, a diaphragm, a valve controlling lever, a two-point fulcrum therefor, a valve for the inlet, controlled by the lever, a connection between the diaphragm and the lever, and a spring bearing on the lever to press it away from the diaphragm, said valve, spring-bearing and diaphragm connection lying in a line midway between the lever-fulcrums and at right angles to a line connecting the fulcrums, and externally accessible means to adjust the tension of the spring.

8. In a gas-delivery regulator, the combination of a casing provided with an inlet and outlet, a diaphragm, a valve controlling lever, a two-point fulcrum therefor, a valve for the inlet, controlled by the lever, a connection between the diaphragm and the lever, and a U-shaped spring bridging and bearing on the lever to press it away from the diaphragm, said valve, spring-bearing, and diaphragm connection lying in a line midway between the lever-fulcrums and at right angles to a line connecting the fulcrums, and externally accessible means to adjust the tension of the spring.

9. In a gas delivery regulator, the combination of a casing provided with an inlet and outlet, a diaphragm, a T-shaped valve controlling lever, a two-point fulcrum therefor, a valve for the inlet, controlled by the lever, a connection between the diaphragm and the lever, a U-shaped spring bridging and bearing on the lever to press it away from the diaphragm, the lever-diaphragm connection and the two points of the lever fulcrum forming the points of an isosceles triangle, the bearing of the spring on the lever and the ends of the U-shaped spring forming another isosceles triangle, the lever-diaphragm bearing lying in the latter triangle and the spring-lever bearing in the former, both said points and the valve lying in the common axis of the two triangles, and externally accessible means to adjust the tension of the spring.

10. In a gas-delivery regulator, the combination of a casing provided with an inlet and outlet, a diaphragm, a valve controlling lever, a two-point fulcrum therefor, a loosely mounted self-seating valve for the inlet, controlled by the lever, a connection between the diaphragm and the lever, and a spring-bearing on the lever to press it away from the diaphragm, said valve, spring-bearing and diaphragm connection lying in a line midway between the lever-fulcrums and at right angles to a line connecting the fulcrums.

11. In a gas-delivery regulator, the combination of a casing provided with an inlet and outlet, a diaphragm, a valve controlling lever, a two-point fulcrum therefor, a loosely mounted self-seating valve for the inlet, controlled by the lever, a connection between the diaphragm and the lever, and a U-shaped spring bridging and bearing on the lever to press it away from the diaphragm, said valve, spring-bearing, and diaphragm connection lying in a line midway between the lever-fulcrums and at right angles to a line connecting the fulcrums.

12. In a gas-delivery regulator, the combination of a casing provided with an inlet and outlet, a diaphragm, a T-shaped valve controlling lever, a two-point fulcrum therefor, a loosely mounted self-seating valve for the inlet, controlled by the lever, a connection between the diaphragm and the lever, a U-shaped spring bridging and bearing on the lever to press it away from the diaphragm, the lever-diaphragm connection and the two-points of the lever fulcrum forming the points of an isosceles triangle, the bearing of the spring on the lever and the ends of the U-spring forming another isosceles triangle, the lever-diaphragm bearing lying in the latter triangle, and the spring lever bearing in the former, both said points and the valve lying in the common axis of the two triangles.

13. In a gas-delivery regulator, the combination of a casing provided with an inlet and outlet, a diaphragm, a valve controlling lever, a two-point fulcrum therefor, a loosely mounted self-seating valve for the inlet, controlled by the lever, a connection between the diaphragm and the lever, and a spring bearing on the lever to press it away from the diaphragm, said valve, spring-bearing and diaphragm connection lying in a line midway between the lever-fulcrums and at right angles to a line connecting the fulcrums, and means to adjust the tension of the spring.

14. In a gas-delivery regulator, the combination of a casing provided with an inlet and outlet, a diaphragm, a valve controlling lever, a two-point fulcrum therefor, a loosely mounted self-seating valve for the inlet, controlled by the lever, a connection between the diaphragm and the lever, and a U-shaped spring bridging and bearing on the lever to press it away from the diaphragm, said valve, spring-bearing, and diaphragm connection lying in a line midway between the lever-fulcrums and at right angles to a line connecting the fulcrums, and means to adjust the tension of the spring.

15. In a gas-delivery regulator, the combination of a casing provided with an inlet and outlet, a diaphragm, a T-shaped valve controlling lever, a two-point fulcrum therefor, a loosely mounted self-seating valve for the inlet, controlled by the lever, a connection between the diaphragm and the lever, a U-shaped spring bridging and bearing on the lever to press it away from the diaphragm, the lever-diaphragm connection and the two points of the lever fulcrum forming the points of an isosceles triangle, the bearing of the spring on the lever and the ends of the U-spring forming another isosceles triangle, the lever-diaphragm bearing lying in the latter triangle, and the spring-lever bearing in the former, both said points and the valve lying in the common axis of the two triangles, and means to adjust the tension of the spring.

16. In a gas-delivery regulator, the combination of a casing provided with an inlet and outlet, a diaphragm, a valve controlling lever, a two-point fulcrum therefor, a loosely mounted self-seating valve for the inlet, controlled by the lever, a connection between the diaphragm and the lever, and a spring bearing on the lever to press it away from the diaphragm, said valve, spring-bearing and diaphragm connection lying in a line midway between the lever-fulcrums and at right angles to a line connecting the fulcrums, and externally accessible means to adjust the tension of the spring.

17. In a gas-delivery regulator, the combination of a casing provided with an inlet and outlet, a diaphragm, a valve controlling lever, a two-point fulcrum therefor, a loosely mounted self-seating valve for the inlet, controlled by the lever, a connection between the diaphragm and the lever, and a U-shaped spring bridging and bearing on the lever to press it away from the diaphragm, said valve, spring-bearing, and diaphragm connection lying in a line midway between the lever-fulcrums and at right angles to a line connecting the fulcrums, and externally accessible means to adjust the tension of the spring.

18. In a gas-delivery regulator, the combination of a casing provided with an inlet and outlet, a diaphragm, a T-shaped valve controlling lever, a two-point fulcrum therefor, a loosely mounted self-seating valve for the inlet, controlled by the lever, a connection between the diaphragm and the lever, a U-shaped spring bridging and bearing on the lever to press it away from the diaphragm, the lever-diaphragm connection and the two points of the lever fulcrum forming the points of an isosceles triangle, the bearing of the spring on the lever and the ends of the U-shaped spring forming another isosceles triangle, the lever-diaphragm bearing lying in the latter triangle and the spring-lever bearing in the former, both said points and the valve lying in the common axis of the two triangles, and externally accessible means to adjust the tension of the spring.

WILLIAM R. PARK.

Witnesses:
ODIN ROBERTS.
CHARLES D. WOODBERRY.

Copies of this patent may be obtained for five cents each, by addressing the "Commissioner of Patents, Washington, D. C."